Figure 1:
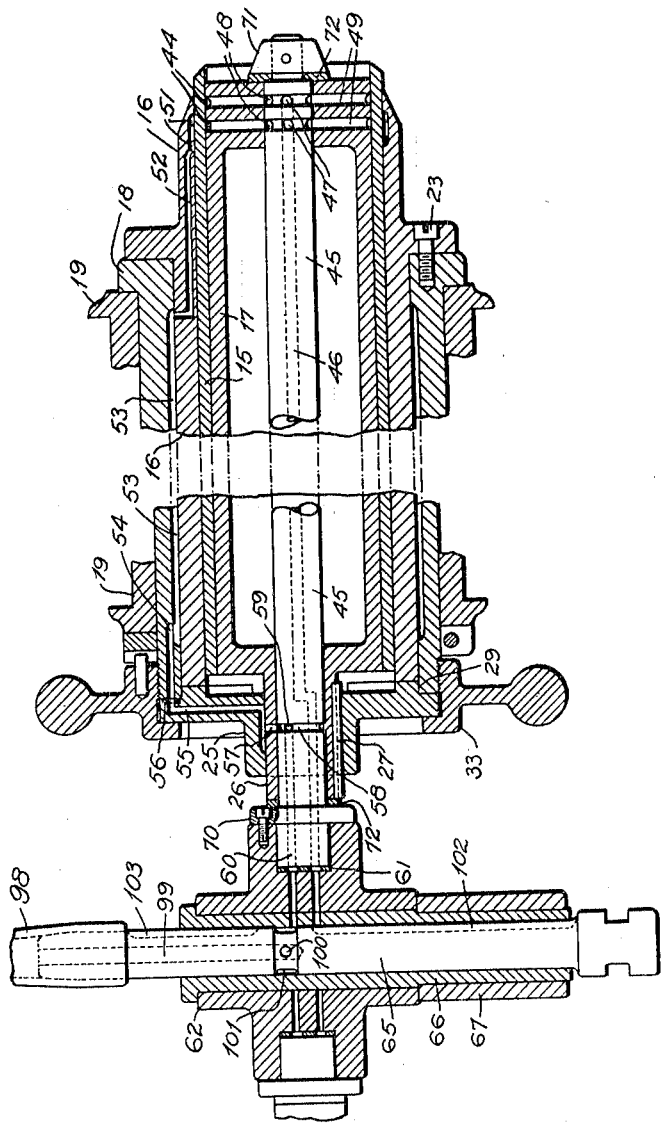

W. H. HONISS.
PROCESS OF PNEUMATIC FEEDING.
APPLICATION FILED JULY 26, 1910.

1,118,552.

Patented Nov. 24, 1914.
3 SHEETS—SHEET 1.

Witnesses:
S. S. Grotta.
K. E. Peiler.

Inventor:
Wm H Honiss.

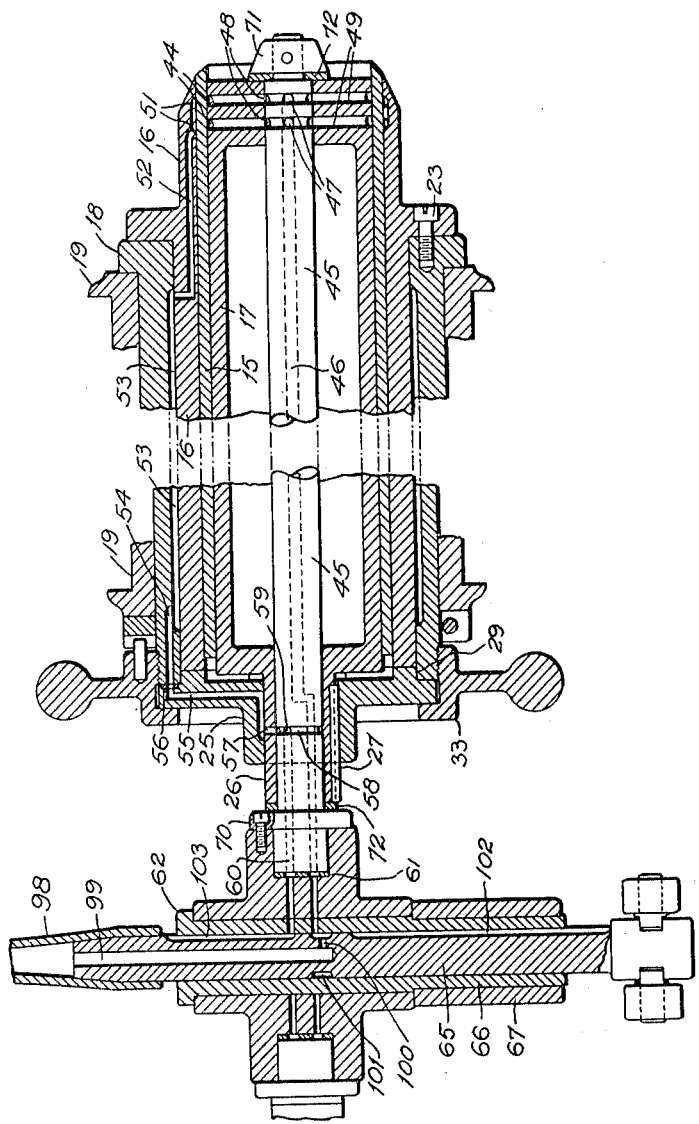

W. H. HONISS.
PROCESS OF PNEUMATIC FEEDING.
APPLICATION FILED JULY 26, 1910.
1,118,552.
Patented Nov. 24, 1914.
3 SHEETS—SHEET 3.
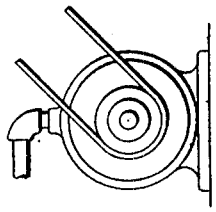
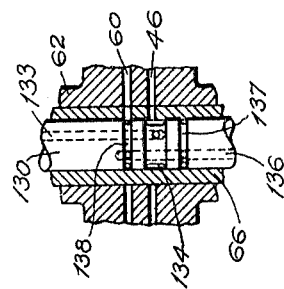
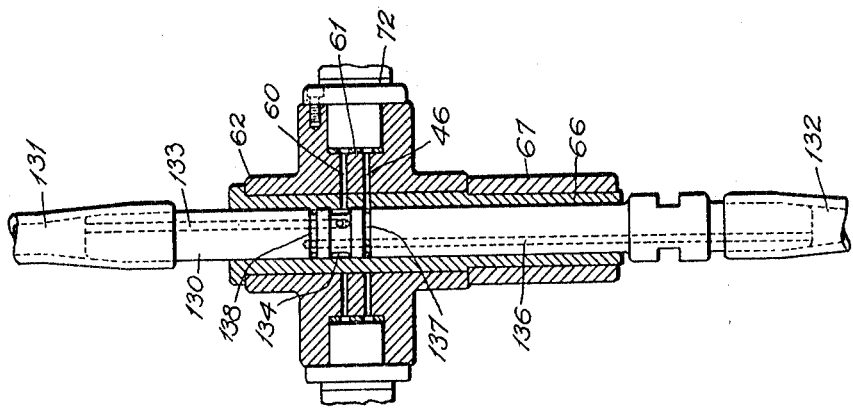
Witnesses:
S. S. Grotta
K. E. Peiler
Inventor:
W. H. Honiss.

UNITED STATES PATENT OFFICE.

WILLIAM H. HONISS, OF HARTFORD, CONNECTICUT, ASSIGNOR OF ONE-FOURTH TO HIMSELF, ONE-FOURTH TO WILLIAM A. LORENZ, OF HARTFORD, CONNECTICUT, AND ONE-HALF TO BEECH-NUT PACKING COMPANY, OF CANAJOHARIE, NEW YORK, A CORPORATION OF NEW YORK.

PROCESS OF PNEUMATIC FEEDING.

1,118,552.  Specification of Letters Patent.  Patented Nov. 24, 1914.

Original application filed May 13, 1907, Serial No. 373,450. Divided and this application filed July 26, 1910. Serial No. 573,858.

*To all whom it may concern:*

Be it known that I, WILLIAM H. HONISS, a citizen of the United States, and resident of Hartford, in the county of Hartford and State of Connecticut, have invented certain new and useful Improvements in Processes of Pneumatic Feeding, of which the following is a full, clear, and exact specification.

This invention relates to processes of feeding by pneumatic action, the particular embodiment herein shown and described being adapted for the feeding of tubes made of flexible material, such as rubber, in connection with apparatus designed for cutting the tubes into ring gaskets for use in making the closure joints of hermetically sealed jars and similar receptacles. Although designed and intended for this particular purpose of feeding the tubes longitudinally by a step-by-step movement, between the operations of cutting the rings from the end of the tube, the process itself may be obviously adapted for feeding the tubes in any desired direction, or of feeding in any direction any article which is susceptible of the pneumatic action which is an important characteristic of this improved process.

This application is a division of my pending application Serial No. 373,450, filed May 13, 1907, and for the purpose of illustrating a useful application of the process, I have shown herein a portion of the apparatus which is the subject of my said prior pending application.

Figure 1 of the drawings is a plan view, in section taken substantially through the longitudinal center of the apparatus, showing the parts in the position in which the pneumatic action takes effect on one side or portion of the tube or article to be fed, with the feeder in its advanced position. Fig. 2 is a similar view, showing the parts in a position in which the pneumatic action takes effect upon another side or portion of the tube, and also showing the feeder in its retracted position, as compared with the position of Fig. 1. Figs. 3 and 4 are plan views illustrating a modified form of valve, enabling the process to employ both high pressure and exhaust, the two views being similar, with the exception that they show the valve in two different positions. Fig. 5 is a side view, showing a conventional form of exhaust or pressure blower for use with this process.

This improved process consists mainly in intermittently holding and releasing portions of the surface of the tube or other article, and advancing the article while so held by one portion and released elsewhere, the alternations of the pneumatic action maintaining control of the tube at all positions. As applied to tubes, particularly of rubber and similar material, this process consists in holding the tube by atmospheric pressure, intermittently applied to the inner or outer surface of the tube and advancing it bodily between or during the intermissions. In carrying out this process with tubing of this character, the tube is guided within a receiver or holding member which approximately fits the exterior wall of the tube. A feeding member, which preferably consists of a cylindrical plunger, is placed within the tube, approximately fitting the interior wall thereof, so that the tube occupies and is guided through the annular space between the exterior of the plunger feeder and interior of the receiver. Where, as herein illustrated, both the receiver and the feeder are utilized as pneumatic holders, their leading ends fit the leading end of the tube as closely as may be found practicable, in order to avoid excessive leakage of the air, and consequent loss of pressure. In instances like those hereinafter stated, where atmospheric pressure is employed only between one of these holders and the tube, it is not important to have both of them fit so closely; in fact it may in some cases be desirable to have it fit one holder somewhat loosely, so as to allow atmospheric pressure to pass freely to and from the surface of the tube; or to allow the tube to slide freely, to avoid frictional resistance. In the arrangement shown herein, the walls of both the receiver and the feeder adjacent to the tube are provided with air passages which are extended so as to communicate with any well-known or available means for producing pneumatic pressure either by inducing a vacuum and thus utilizing atmospheric pressure, or by producing a pressure above that of the atmospheric, or using both these forms of pressure producing devices in conjunction, particularly when it may be found desirable to utilize a pressure greater than that of the atmosphere. The pressure is applied intermittently and alternately to the interior and exterior surfaces of the tube, and the latter is advanced while thus held either by the inner or outer side of the tube, and while released on the other side. In practice it is believed to be preferable to feed the tube while held by its inner wall, the feed member or plunger being moved longitudinally to the desired extent while holding the tube, and while the outer surface of the tube is released from the receiver.

For convenience in adapting the apparatus for the manipulation of tubes of different sizes, the receiver 16 is preferably made easily detachable, being, as herein shown, removably attached to the spindle 18, which is mounted in any suitable way, as in the boxes or bearings 19 mounted in a suitable head, which is or may be similar to the head of a lathe and may, for convenience in coöperating with tube cutting or other adjunctive mechanism, be mounted upon a bed. Any suitable means, as a screw or screws 23 may be employed for removably holding the receiver 16 in position in the spindle. By removing the screw the receiver may be withdrawn and other receivers and feeders substituted of sizes and forms suited for the different tubes to be operated upon.

In some instances in which this process of feeding and holding the work may be employed, it may be undesirable or unnecessary to rotate the work, in which case the receiver 16 and the feeder 17 need not be supported for rotative movement. But for many purposes, including the purpose of cutting tubes into gaskets, illustrated herein, it is desirable to rotate the tube. For this reason the spindle 19 is mounted for rotation, as herein shown, and is provided with a pulley, or any other convenient means for imparting the rotative movement. In such cases also it is usually desirable to rotate the feeder 17 coincidentally with the receiver. In the embodiment here shown the receiver and the feeder are mechanically clutched or coupled together by a coupling 25, which is fitted upon a hub 26 of the feeder, and connected therewith by means of a spline 27, which serves to rotate the plunger with the coupling, while permitting the longitudinal sliding movement of the plunger within the receiver and coupler. The coupling is preferably provided with an annular shoulder 29, which fits within the rearward end of the spindle 18 and centralizes the coupling and the plunger with that spindle.

The surfaces of the receiver 16 and plunger 17, which are in contact with the outer and inner walls, respectively, of the tube 15, are adapted to serve as pneumatic grippers or holders coöperating to hold and advance or feed the tube at the desired times and to the desired extent. The plunger 17, which in this instance is shown to be the feeding or advancing member, is provided with grooves 44 which are herein shown to extend circumferentially around the plunger and serve as passages for the air in forcing or inducing pneumatic pressure. These passages are connected in any convenient way through the rearward end of the plunger, either with exhausting apparatus or air compressing apparatus, which may be like that conventionally shown in Fig. 5. In the present instance, the plunger is mounted for rotation upon a non-rotating spindle 45, which is provided with an air passage 46 extending longitudinally within the spindle to the rearward end thereof. At its front end the air passage 46 communicates outwardly by means of the air holes 47 and circumferential grooves 48 with the continuing passages 49 leading to the circumferential grooves 44 on the outer surface of the plunger, thus affording continuous air communication between the latter grooves and the air duct or conduit 46, whether the plunger is rotating or stationary. These grooves are herein shown to be only two in number and situated only at the front end of the plunger, since it is desirable in this particular case to grip the tubes at that end, so that the tubes may be fed forward nearly their entire length before their rearward ends reach and uncover these grooves. Obviously, however, the grooves may be extended farther over or completely over the surface of the plunger. The receiver is also shown to be provided with circumferential air grooves 51, which for the reason just given are also limited to the front end of the receiver. These grooves communicate with the longitudinal groove or grooves 52 which may extend to the rearward end of the receiver, or may, as herein shown, communicate with an annular recess 53 in the interior of the spindle, or the exterior of the receiver. At its rearward end the recess communicates with the air duct 54, which extends to the end of the spindle and communicates with a duct 55 of the coupling 25, air-tight connection being insured if necessary by means of a rubber washer or gasket 56. At its inner end the duct 55 extends into communication with the duct 57, which communicates with the circumferential groove 58, which may be in the interior wall of the hub 26, or, as herein shown, in the exterior surface of the spindle 45, thence extending through the cross duct 59 and longitudinal duct 60, to the end of the spindle; and thence to the exhaust or pressure producing means.

The spindle 45 is supported at its rearward end by a spindle head 62; and the ducts 46 and 60 which communicate independently of each other with the air grooves 44 and 51 of the plunger and receiver, respectively, are extended through the spindle support 62; and their connection with the air exhausting or compressing apparatus, as the case may be, is controlled by means of a valve 65, the construction and operation of which will be hereinafter more particularly described.

The description thus far given relates to a single receiver or holder 16 and a single plunger or feeder 17, and this receiver may be efficiently served by such a single plunger, which after feeding one tube as far as it will go can be withdrawn from the receiver and a succeeding tube be inserted. But to expedite the operation of the device by lessening the time during which its feeding operations are interrupted, I preferably provide a plurality of these plungers, so that while one plunger is performing its feeding operations another plunger may have a new tube mounted upon it in readiness for the next feeding operation. Any desired number of these plungers may be employed. I have, however, shown herein but two plungers, extending in opposite directions from the support 62, which thus becomes a sort of monitor or turret head, which is mounted for rotation upon a stud 66, which is clamped or otherwise secured in the sliding head or carriage 67. The spindles 45 are secured to their supporting monitor 62 in any convenient way. The plungers 17 are mounted on these spindles, being held against endwise movement by suitable collars or shoulders 70 and 71. Washers 72 of rubber or leather, may, if desired, be inserted between the ends of the plunger and its end bearing collars or shoulders, to make these joints more nearly air-tight. Apertured washers or gaskets 61 may be employed between the end of the spindle 45 and the monitor 62, to prevent leakage of air to or from the ducts 46 and 60.

The carriage or slide, or whatever may be employed for supporting the head 67 and the mandrel 62 should be mounted for longitudinal movement in a direction parallel with the longitudinal center line of the receiver, the desired motions being imparted by suitable cams or other driving devices, the details of which have no immediate relation to the process described herein.

The flow of air to and from the receiver 16 and plunger 17 through the ducts 60 and 46, respectively, which determine the application of the pneumatic pressure, is controlled by means of the valve 65, which is preferably of a cylindrical form and is mounted for sliding movement in the stud 66, as shown by a comparison of the position of the valve in Figs. 1 and 2. In the arrangement shown in Figs. 1 and 2 it is assumed that the pressures are produced either by exhaustion alone, or compression alone,—not by a combination of both.

The end of the valve 65 is connected with any suitable exhaust or pressure producing apparatus, like that shown in Fig. 5, by means of a tube 98 which is either jointed or flexible to permit of the longitudinal and transverse movements of the valve. The duct 99 extends from the tube 98 through the outwardly opening passage or passages 100 to the distributing passage 101, which when in the position shown in Fig. 1 communicates with the duct 60 leading to the receiver 16; and when in the other position shown in Fig. 2 communicates with the duct 46 leading to the plunger 17. Relief or exhaust passages 102 and 103 are preferably provided in the valve 65 connecting either of the passages 60 or 46 with the open air when the other of those passages is in communication with the distributing passage 101.

The valve 65 is pushed back and forth between the positions shown in Figs. 1 and 2 at suitable intervals, in time with the desired holding and releasing operations of the pneumatic action, and in suitable relation to the desired feeding movement of the work. Suitable mechanism for this purpose is shown in my companion application above referred to; but forms no part of the present invention, hence is not described herein.

Any suitable knife or other instrument, worked by appropriate mechanism, may be employed for cutting off or otherwise operating upon the projecting end of the tube when in the position shown in Fig. 1.

Any suitable air pressure inducing mechanism, for example, of the general type shown in Fig. 5, may be employed for producing the desired pneumatic pressures; and pressures above the atmosphere may be employed, either in conjunction with atmospheric pressure or with pressure below that of the atmosphere. Similarly, pressure below the atmosphere, or "exhaust" pressure may be employed either in connection with atmospheric pressure or with pressure above the atmosphere. The degree of pressure, and of difference in pressure should be adapted to each requirement, the selection of the proper pressure, and their correlation being matters well understood by those familiar with the subject of pneumatics in general.

The operation of this process in connection with the tube and with the apparatus shown in the drawings is as follows:—The feeder 17 being withdrawn from the receiver, the tube is placed in position upon the feeder 17 and the latter is carried forward by pushing the sliding head 67 forward. The coupling 25 is then adjusted to its seat against the end of the receiver 16 and its spindle 18; and is fastened to that position by means of the clamp nut 33. The forward feeding movement then begins. Assuming that the tube 98 is connected with exhausting apparatus, the valve 65 when in the position shown in Fig. 1 directs the exhaust to take effect through the duct 60 and the grooves or recesses 51 of the receiver, while permitting atmospheric pressure to enter through the relief passage 102 and duct 46, thus holding the tube outwardly against the inner wall of the receiver 16 and releasing the feeder 17. The latter is then drawn backwardly to the required extent by the operation of a suitable cam. When the feeder reaches its rearward resting position, the valve 65 is moved to the position shown in Fig. 4, thus connecting its distributing passage 101 with the duct 46 and grooves 44 of the feeder and at the same time admitting atmospheric pressure through the ducts 103 and 60 to the grooves 51 of the receiver, thus releasing the tube from the receiver and pressing it inwardly against the feeder. The width of the distributing passage 101 of the valve relative to the ducts 46 and 60 is such that when the valve is moved from one position to the other, the exhaust takes full effect upon one of those ducts before being shut off from the other duct; or at least before atmospheric pressure is admitted to the other duct, so as to retain the tube at all times under control of the pressure, gaining a hold on one side before releasing the other side. With the tube thus held against the feeder 17 the latter is moved forwardly by its cam, thus projecting the leading end of the tube beyond the front end of the feeder and receiver, where the parts remain while the gasket ring is being severed or otherwise operated on, as shown in Fig. 1. Then the valve 65 is moved again to the position shown in Fig. 1, pressing the tube away from the feeder and against the receiver to permit the plunger to be again retracted without also retracting or otherwise moving the tube. Thus the forward feeding movements are continued intermittently and alternately, and also in alternation with the operations of the cutter for cutting off the end of the tube. When finally the rearward end of the tube passes to or beyond the grooves 51 and 44, and the feeding stops, the screw nut 33 is turned, and the coupling 25 is withdrawn. Then the sliding head 67 is drawn backwardly to withdraw the feeder 17 from the receiver. In the case of a machine having but a single feeder 17 a new tube is then placed in position, the parts are again pushed forward and coupled to the receiver, and the feeding movement is again resumed. In the case of a machine having a plurality of plungers 17 upon a swinging turret or monitor head 62, the feeder which is out of feeding operation is supplied with a new tube while the other feeder is feeding its tube forward, the monitor head being turned upon its supporting stud 66 when the sliding head 67 is retracted so as to bring the feeder carrying the new tube into alinement with the receiver.

In the case of a machine operated by compressed air the operation is quite similar; the principal difference being in the position of the valve 65, which is the reverse of that required for operating by exhaust and atmospheric pressure. In other words, when employing compressed air the valve 65, when in the position shown in Fig. 1, admits the pressure through the receiver to the outer side of the tube, holding the latter against the feeder 17 and continues thus to hold it during the forward feeding movement of the feeder, after which the valve is shifted to the position shown in Fig. 2 which admits pressure through the ducts 46 and 44 to the inner side of the tube, holding it outwardly against the receiver and thus releasing the feeder which is then drawn back. In this case the relief ducts 102 and 103 operate to release the pressure from each of the ducts 46 and 60 when the other of those ducts receives the pressure.

During the time that the projecting tube is being operated upon by the cutter or other means, it may be held either to the feeder 17, or to the receiver 16, as may be found most convenient or desirable, according to the character of the operation and direction in which it is applied.

The modification shown in Figs. 3 and 4 adapts the machine to employ exhaust and atmospheric pressure in connection with what may be here termed "super-atmospheric pressure", or air compressed above atmospheric pressure. The modification is confined to the valve itself which has a double ended connection, one end being connected with exhausting apparatus, and the other end with compressing apparatus, either or both of which may be of the type represented in a general way by Fig. 5, the characteristic differences between exhaust and pressure blowers being well understood. As this modification is shown, the valve 130 is provided with flexible or jointed tubes 131 and 132, one leading to pressure and the other to exhaust apparatus. For definiteness in description it is herein assumed that the tube 131 connects with an exhaust apparatus, while the tube 132 connects with air compressing apparatus. The duct 133 leads from the tube 131 to the distributing passage 134, these being similar in arrangement to the corresponding ducts and passages of the valve 65 shown in the previous figures. The front or compression end of the valve 130 is provided with a duct 136, which leads from the tube 132 to two distributing passages 137 and 138. The relation of these distributing passages to each other and to the ducts 46 and 60 of the feeders and receiver, during the movements of the valve, is shown by comparison of Figs. 3 and 4. In Fig. 3 the duct 60 leading to the receiver is in communication with the exhaust, while the duct 46 leading to the plunger is in communication with the high pressure or compressing apparatus, thus serving to hold the tube outwardly against the receiver, with a pressure which is determined by the pressure delivered by the air compressing device, and may be varied to suit different conditions. Upon moving the valve to the position shown in Fig. 4, the holding conditions are reversed, the duct 46 leading to the feeder being then connected with the exhaust, while the duct 60 leading to the receiver is connected with the pressure, thus pressing the tube against the feeder, at which time the feeder is given its forward feeding movement to advance the tube.

When using the simple exhaust plan the pressure is obviously limited to that of the atmosphere, whereas by using forced pressure it may be increased to any extent likely to be found necessary. Although for many purposes the arrangement shown in Figs. 1 and 2, employing what may be termed a "single" or "simple" pressure, will be found sufficient for holding and feeding tubes with certainty and uniformity; for some other purposes it may be found desirable to employ the double acting method shown in Figs. 3 and 4. To effect the change from one to the other it is only necessary to remove the valve 65 from the apparatus and replace it with the valve 130, the length of stroke and time of operation as herein arranged being the same.

The valve shown in Figs. 3 and 4 is adapted like that shown in Figs. 1 and 2 to gain a hold on one side of the tube before releasing its hold on the other side of the tube. This is due to the spacing and lapping of the valve passages relative to the ducts 46 and 60.

In some instances it may be found feasible or even preferable to employ air pressure only on one side of the tube, utilizing the elastic properties of the tube to impart the required holding pressure in the opposite direction, in alternation with the air pressure. For example, the tubes may be found, or may be made, to fit the feeder 17 tightly enough, and the receiver loosely enough to carry the tube with the feeder, without any air pressure on the outer surface of the tube. In such a case it will be sufficient to employ air pressure only within the tube through the duct 46 and its associated passages, to expand the tube outwardly against the receiver 16, and thus free it from the feeder 17 while the latter is drawn back to get a new feeding hold on the tube. The pressure is then released, allowing the tube to contract again upon the feeder 17 and away from the receiver, leaving it free to slide forward with the feeder. Or the tube may similarly be found, or may be made, to fit the receiver 16 tightly, in which case the pneumatic pressure would be applied upon the outside of the tube, either by direct pressure through the duct 60 and its connections, or indirectly by exhausting through the duct 46. In either of these ways the tube may hold itself by virtue of its own elasticity and frictional contact, either with the feeder or with the receiver, for holding it still, or for its advancing movement. Any of these modified ways may be carried out by the present apparatus, merely by replacing the washer or gasket 61 with another washer or gasket having only one aperture registering with the duct which it is desired to leave open, or by making a constant connection for the atmosphere to the inner or outer holder, as may be required.

Under some conditions, or for some purposes, it may be found preferable to impart the advancing movement of the tube by means of the receiver, using the inner holder 17 as the stationary holding member, and sliding the receiver forward and back in its bearings, instead of sliding the feeder 17 as herein shown and described. It may also in some cases be found sufficient to dispense with the air grooves and passages in the receiver or whichever may be the stationary member. In that case the tube may fit the stationary member somewhat closely, so as to hold thereto by friction, while the feed member is being retracted to get a new hold. But for most purposes I prefer to employ air pressure alternately on opposite sides of the tube.

The term "super-atmospheric" is for convenience and brevity herein employed to designate pressures above that commonly designated as atmospheric pressure, the latter of which at no time reaches fifteen pounds per square inch, and varies below that according to the degree of exhaustion or vacuum by which it is induced, whereas super-atmospheric pressure, obtained by compressing the air in any of several well-known ways, may be carried to any degree likely to be desired.

I claim as my invention:—

1. The process of feeding an article which consists in independently engaging the article at different portions of its surface by pneumatic holding and advancing means operating in alternation to release and feed the article.

2. The process of feeding a tube, which consists in holding the tube by pneumatic pressure independently at different portions of its surface, and advancing the tube by alternately applying and releasing the pneumatic pressure at the said different portions, and moving one of the said holding means while the tube is held to it by the pneumatic pressure, and is released from the other holding means.

3. The process of holding and feeding a tube, which consists in holding the interior and exterior sides of the tube alternately by pneumatic pressure, and feeding the tube forward intermittently in conjunction with the alternations of pneumatic pressure.

4. The process of feeding a tube, which consists in intermittently holding and releasing the interior and exterior of the tube by pneumatic action and advancing the tube while being held on one side and released on the other side.

5. The process of feeding a tube, which consists in intermittently holding and releasing the interior and exterior of the tube in alternation, and advancing the tube intermittently in conjunction with the successive holding and releasing operations.

6. The process of feeding an article, which consists in holding the article by pneumatic pressure alternately to different holding members, and advancing one of the said holding members while the article is thus held thereto.

7. The process of feeding an article, which consists in holding the article by pneumatic pressure alternately to a holding member, and to a feeding member, advancing the feeding member while the article is thus held to it, and retracting the feeding member during the alternations in the holding action when the article is held to the holding member.

8. The process of feeding a tube, which consists in supporting the tube by a guide reciprocating a feeder along the guide, and intermittently holding the tube to the feeder by pneumatic pressure during its movements in the desired direction of feed.

9. The process of feeding a tube, which consists in alternately expanding and contracting the tube by pneumatic pressure and feeding it during one of the said alternations.

10. The process of feeding a tube, which consists in alternately expanding and contracting the tube against a feeder by pneumatic pressure, and advancing the feeder while the tube is thus held against it.

11. The process of feeding a tube, which consists in guiding the tube between pneumatic holders within and without the tube, pressing the tube alternately against the said holder by pneumatic pressure, and moving one of said holders while the tube is thus pressed against it.

12. The process of feeding a tube, which consists in guiding the tube between pneumatic holders, one substantially fitting the interior surface of the tube and the other substantially fitting the exterior surface thereof, holding the tube by pneumatic pressure alternately to the said holders and advancing one of said holders while the tube is thus held to it.

13. The process of feeding a tube, which consists in guiding the tube over one cylindrical holder, and within another cylindrical holder, reciprocating one of said holders relative to the other, and applying pneumatic pressure to hold the tube intermittently and alternately to the said holders.

14. The process of feeding an article, which consists in holding the article by exhausting the air from the side and applying pneumatic pressure above atmospheric pressure to the other side, and moving the article while so held.

15. The process of feeding an article, which consists in holding the article to a feeding member with atmospheric pressure induced by exhausting air from one side and applying super-atmospheric pressure to the other side, advancing the article while so held, releasing the pressure and retracting the feeding member.

16. The process of feeding an article, which consists in holding the article alternately to a holding member and a feeding member by atmospheric pressure induced by exhausting air from one side of the article and applying super-atmospheric pressure to the other side, and advancing the article while so held by the feeding member.

17. The process of feeding a tube, which consists in holding the tube alternately to a holding member and a feeding member by atmospheric pressure, induced by exhausting the air from one side of the tube wall and applying super-atmospheric pressure to the other side of the tube wall, advancing the feeding member while the tube is thus held to it, and retracting the feeding member during the alternations, when the tube is pressed against the holding member.

In testimony whereof I have signed my name to this specification in the presence of two subscribing witnesses.

WM. H. HONISS.

Witnesses:
CAROLINE M. BRECKLE,
JOSEPH MERRITT.